United States Patent
Vorberg et al.

(10) Patent No.: US 10,464,013 B2
(45) Date of Patent: Nov. 5, 2019

(54) ABSORBENT FOR SELECTIVE REMOVAL OF HYDROGEN SULFIDE FROM A FLUID STREAM

(71) Applicant: BASF SE, Ludwigshafen (DE)

(72) Inventors: Gerald Vorberg, Speyer (DE); Ralf Notz, Maxdorf (DE); Thomas Ingram, Mannheim (DE); Georg Sieder, Bad Duerkheim (DE); Torsten Katz, Neustadt (DE)

(73) Assignee: BASF SE, Ludwigshafen (DE)

( * ) Notice: Subject to any disclaimer, the term of this patent is extended or adjusted under 35 U.S.C. 154(b) by 23 days.

(21) Appl. No.: 15/506,451

(22) PCT Filed: Aug. 20, 2015

(86) PCT No.: PCT/EP2015/069109
§ 371 (c)(1),
(2) Date: Feb. 24, 2017

(87) PCT Pub. No.: WO2016/030262
PCT Pub. Date: Mar. 3, 2016

(65) Prior Publication Data
US 2018/0221811 A1    Aug. 9, 2018

(30) Foreign Application Priority Data
Aug. 25, 2014  (EP) .................................... 14182112

(51) Int. Cl.
*B01D 53/14* (2006.01)
*B01D 53/78* (2006.01)
*B01D 53/96* (2006.01)
*C07C 217/08* (2006.01)
*C07C 217/28*
(Continued)

(52) U.S. Cl.
CPC ..... *B01D 53/1468* (2013.01); *B01D 53/1493* (2013.01); *C10L 3/103* (2013.01);
(Continued)

(58) Field of Classification Search
None
See application file for complete search history.

(56) References Cited

U.S. PATENT DOCUMENTS 4,094,957 A  6/1978  Sartori et al.
4,101,633 A  7/1978  Sartori et al.
(Continued)

FOREIGN PATENT DOCUMENTS

CA    1290553 C    10/1991
CA    1295810 C    2/1992
(Continued)

OTHER PUBLICATIONS

Attari et al., "Sampling and analysis of natural gas trace constituents." Instit. of Gas Tech., Sep. 1993.*
(Continued)

*Primary Examiner* — Daniel Berns
(74) *Attorney, Agent, or Firm* — Oblon, McClelland, Maier & Neustadt, L.L.P.

(57) ABSTRACT

An absorbent for selective removal of hydrogen sulfide from a fluid stream comprises an aqueous solution of a) a tertiary amine, b) a sterically hindered secondary amine of the general formula (I)

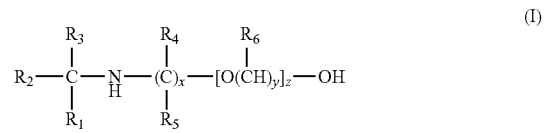

in which $R_1$ and $R_2$ are each independently selected from $C_{1-4}$-alkyl and $C_{1-4}$-hydroxyalkyl; $R_3$, $R_4$, $R_5$ and $R_6$ are each independently selected from hydrogen, $C_{1-4}$-alkyl and
(Continued)

$C_{1-4}$-hydroxyalkyl, with the proviso that at least one $R_4$ and/or $R_5$ radical on the carbon atom bonded directly to the nitrogen atom is $C_{1-4}$-alkyl or $C_{1-4}$-hydroxyalkyl when $R_3$ is hydrogen; x and y are integers from 2 to 4 and z is an integer from 1 to 4; where the molar ratio of b) to a) is in the range from 0.05 to 1.0, and c) an acid in an amount, calculated as neutralization equivalent relative to the protonatable nitrogen atoms in a) and b), of 0.05 to 15.0%. One preferred amine of the formula I is 2-(2-tert-butylaminoethoxy)ethanol. The absorbent allows a defined $H_2S$ selectivity to be set at pressures of the kind typical in natural gas processing.

4 Claims, 1 Drawing Sheet

(51) Int. Cl.
(2006.01)     *C07C 217/42*
(2006.01)     *C10L 3/10*
(2006.01)

(52) U.S. Cl.
CPC .. *B01D 2251/506* (2013.01); *B01D 2251/512* (2013.01); *B01D 2252/205* (2013.01); *B01D 2252/2026* (2013.01); *B01D 2252/20405* (2013.01); *B01D 2252/20431* (2013.01); *B01D 2252/20484* (2013.01); *B01D 2252/20494* (2013.01); *B01D 2252/504* (2013.01); *B01D 2252/60* (2013.01); *C10L 2200/0259* (2013.01); *C10L 2200/0263* (2013.01); *C10L 2200/0268* (2013.01); *C10L 2290/06* (2013.01); *C10L 2290/12* (2013.01); *C10L 2290/48* (2013.01); *C10L 2290/541* (2013.01); *C10L 2290/545* (2013.01)

(56) References Cited

U.S. PATENT DOCUMENTS

| | | |
|---|---|---|
| 4,471,138 A | 9/1984 | Stogryn |
| 4,537,753 A | 8/1985 | Wagner et al. |
| 4,551,158 A | 11/1985 | Wagner et al. |
| 4,553,984 A | 11/1985 | Volkamer et al. |
| 4,618,481 A | 10/1986 | Heinzelmann et al. |
| 4,892,674 A | 1/1990 | Ho et al. |
| 4,997,630 A | 3/1991 | Wagner et al. |
| 4,999,031 A | 3/1991 | Gerhardt et al. |
| 6,436,174 B1 | 8/2002 | Grossmann et al. |
| 9,295,942 B2 | 3/2016 | Katz et al. |
| 2009/0199713 A1 | 8/2009 | Asprion et al. |
| 2010/0288125 A1 | 11/2010 | Vorberg et al. |
| 2013/0243676 A1 | 9/2013 | Siskin et al. |

FOREIGN PATENT DOCUMENTS

| | | |
|---|---|---|
| EP | 0 084 943 A2 | 8/1983 |
| EP | 0 121 109 A2 | 10/1984 |
| EP | 0 134 948 A2 | 3/1985 |
| EP | 0 159 495 A2 | 10/1985 |
| EP | 0 190 434 A2 | 8/1986 |
| EP | 0 202 600 A2 | 11/1986 |
| EP | 0 359 991 A1 | 3/1990 |
| WO | WO 00/00271 A1 | 1/2000 |
| WO | WO 2007/134994 A2 | 11/2007 |

OTHER PUBLICATIONS

International Search Report and Written Opinion dated Nov. 18, 2015 in PCT/EP2015/069109 with partial English language translation.
International Preliminary Report on Patentability dated Dec. 8, 2016 in PCT/EP2015/069109 with English language translation.
Jian-Gang Lu, et al., "Selective absorption of $H_2S$ from gas mixtures into aqueous solutions of blended amines of methyldiethanolamine and 2-tertiarybutylamino-2-ethoxyethanol in a packed column", Separation and Purification Technology, Elsevier Science, XP028035520, vol. 52, No. 2, Dec. 1, 2006, pp. 209-217.
U.S. Appl. No. 15/506,635, filed Feb. 24, 2017, Thomas Ingram.
U.S. Appl. No. 15/506,646, filed Feb. 24, 2017, Thomas Ingram.
U.S. Appl. No. 15/506,472, filed Feb. 24, 2017, Thomas Ingram.

\* cited by examiner

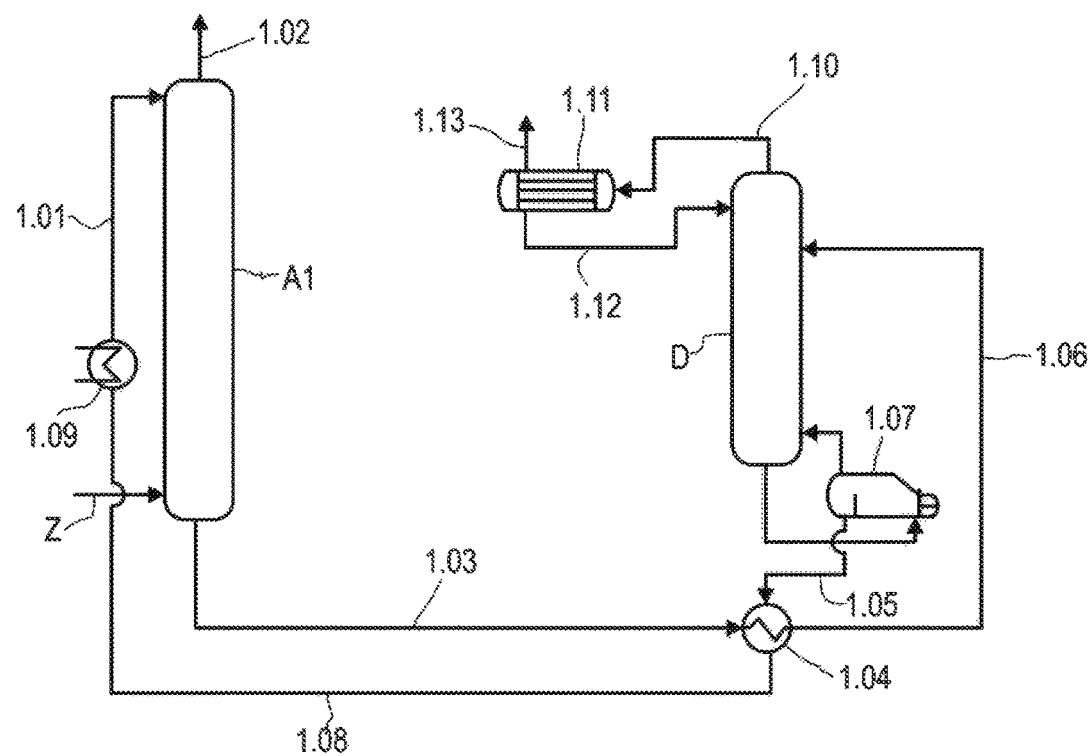

ABSORBENT FOR SELECTIVE REMOVAL OF HYDROGEN SULFIDE FROM A FLUID STREAM

The present invention relates to an absorbent for removing acidic gases from fluid streams, especially for selective removal of hydrogen sulfide, and to a process for removing acidic gases from a fluid stream, especially for selective removal of hydrogen sulfide over carbon dioxide.

The removal of acid gases, for example $CO_2$, $H_2S$, $SO_2$, $CS_2$, HCN, COS or mercaptans, from fluid streams such as natural gas, refinery gas or synthesis gas is important for various reasons. The content of sulfur compounds in natural gas has to be reduced directly at the natural gas source through suitable treatment measures, since the sulfur compounds form acids having corrosive action in the water frequently entrained by the natural gas. For the transport of the natural gas in a pipeline or further processing in a natural gas liquefaction plant (LNG=liquefied natural gas), given limits for the sulfur-containing impurities therefore have to be observed. In addition, numerous sulfur compounds are malodorous and toxic even at low concentrations.

One of the reasons carbon dioxide must be removed from natural gas is that a high concentration of $CO_2$ reduces the calorific value of the gas. Moreover, $CO_2$ in conjunction with moisture, which is frequently entrained in the fluid streams, can lead to corrosion in pipes and valves. If natural gas is liquefied for transport as liquefied natural gas (LNG), the $CO_2$ must be largely removed beforehand. At the temperature of the liquefied natural gas (around −162° C.), the $CO_2$ would resublimate and would damage plant components. Too low a concentration of $CO_2$, on the other hand, can likewise be undesirable, in connection, for example, with feeding into the natural gas network, since the calorific value of the gas can be too high as a result.

Acid gases are removed by using scrubbing operations with aqueous solutions of inorganic or organic bases. When acid gases are dissolved in the absorbent, ions form with the bases. The absorption medium can be regenerated by decompression to a lower pressure and/or by stripping, in which case the ionic species react in reverse to form acid gases and/or are stripped away by means of steam. After the regeneration process, the absorbent can be reused.

A process in which all acid gases, especially $CO_2$ and $H_2S$, are very substantially removed is referred to as "total absorption". In particular cases, in contrast, it may be desirable to preferentially absorb $H_2S$ over $CO_2$, for example in order to obtain a calorific value-optimized $CO_2$/$H_2S$ ratio for a downstream Claus plant. In this case, reference is made to "selective scrubbing". An unfavorable $CO_2$/$H_2S$ ratio can impair the performance and efficiency of the Claus plant through formation of $COS$/$CS_2$ and coking of the Claus catalyst or through too low a calorific value.

Highly sterically hindered secondary amines, such as 2-(2-tert-butylaminoethoxy)ethanol, and tertiary amines, such as methyldiethanolamine (MDEA), exhibit kinetic selectivity for $H_2S$ over $CO_2$. These amines do not react directly with $CO_2$; instead, $CO_2$ is reacted in a slow reaction with the amine and with water to give bicarbonate—in contrast, $H_2S$ reads immediately in aqueous amine solutions. Such amines are therefore especially suitable for selective removal of $H_2S$ from gas mixtures comprising $CO_2$ and $H_2S$.

The selective removal of hydrogen sulfide is frequently employed in the case of fluid streams having low partial acid gas pressures, for example in tail gas, or in the case of acid gas enrichment (AGE), for example for enrichment of $H_2S$ prior to the Claus process.

For instance, U.S. Pat. No. 4,471,138 showed that highly sterically hindered secondary amines such as 2-(2-tert-butylaminoethoxy)ethanol, even in combination with further amines such as methyldiethanolamine, have a much higher $H_2S$ selectivity than methyldiethanolamine. This effect was confirmed, inter alia, by Lu et al. in Separation and Purification Technology, 2006, 52, 209-217. EP 0 084 943 discloses the use of tertiary alkanolamines and highly sterically hindered secondary and tertiary alkanolamines in absorption solutions for selective removal of hydrogen sulfide over carbon dioxide from gas streams.

EP 134 948 describes an absorbent comprising an alkaline material and an acid having a $pK_a$ of 6 or less. Preferred acids are phosphoric acid, formic acid or hydrochloric acid. The addition of acid is especially said to make the stripping of $H_2S$-comprising acidic gases more efficient.

U.S. Pat. No. 4,618,481 discloses the removal of hydrogen sulfide from fluid streams with an absorption solution comprising a highly sterically hindered amine and an amine salt. U.S. Pat. No. 4,892,674 discloses the removal of hydrogen sulfide from fluid streams with an absorption solution comprising an amine and a highly sterically hindered amino salt and/or a sterically hindered amino acid. One teaching of the document, with reference to FIG. 3, is that the $H_2S$ selectivity of MDEA can be increased by addition of 2-(2-tert-butylaminoethoxy)ethanol sulfate.

In the case of natural gas treatment for pipeline gas too, selective removal of $H_2S$ over $CO_2$ may be desirable. The absorption step in natural gas treatment is typically effected at high pressures of about 20 to 130 bar (absolute). In general, distinctly higher partial acid gas pressures are present compared, for example, to tail gas treatment, namely, for example, at least 0.2 bar for $H_2S$ and at least 1 bar for $CO_2$.

A use example within this pressure range is disclosed in U.S. Pat. No. 4,101,633, in which a process for removing carbon dioxide from gas mixtures is described. An absorbent comprising at least 50% of a sterically hindered alkanolamine and at least 10% of a tertiary amino alcohol is used. U.S. Pat. No. 4,094,957 discloses a use example within this pressure range, in which a process for removing carbon dioxide from a gas mixture is described. An absorbent comprising a basic alkali metal salt or hydroxide, at least one sterically hindered amine and a $C_{4-8}$ amino acid is used.

In many cases, the aim in natural gas treatment is simultaneous removal of $H_2S$ and $CO_2$, wherein given $H_2S$ limits have to be observed but complete removal of $CO_2$ is unnecessary. The specification typical of pipeline gas requires acid gas removal to about 1.5% to 3.5% by volume of $CO_2$ and less than 4 ppmv of $H_2S$. In these cases, maximum $H_2S$ selectivity is undesirable.

US 2013/0243676 describes a process for absorption of $H_2S$ and $CO_2$ from a gas mixture with an absorbent comprising a highly sterically hindered tertiary etheramine triethylene glycol alcohol or derivatives thereof and a liquid amine.

It is an object of the invention to specify an absorbent and a process that allows the setting of a defined $H_2S$ selectivity at pressures of the kind typically found in the processing of natural gas for pipeline gas. The regeneration energy required is not to be substantially increased relative to $H_2S$-selective absorbents.

The object is achieved by an absorbent for selective removal of hydrogen sulfide from a fluid stream, comprising an aqueous solution which comprises:

a) a tertiary amine;
b) a sterically hindered secondary amine of the general formula (I)

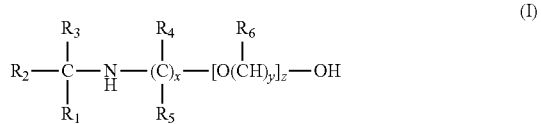

in which $R_1$ and $R_2$ are each independently selected from $C_{1-4}$-alkyl and $C_{1-4}$-hydroxyalkyl; $R_3$, $R_4$, $R_5$ and $R_6$ are each independently selected from hydrogen, $C_{1-4}$-alkyl and $C_{1-4}$-hydroxyalkyl, with the proviso that at least one $R_4$ and/or $R_5$ radical on the carbon atom bonded directly to the nitrogen atom is $C_{1-4}$-alkyl or $C_{1-4}$-hydroxyalkyl when $R_3$ is hydrogen; x and y are integers from 2 to 4 and z is an integer from 1 to 4; where the molar ratio of b) to a) is in the range from 0.05 to 1.0, and c) an acid in an amount, calculated as neutralization equivalent relative to the protonatable nitrogen atoms in a) and b), of 0.05 to 15.0%.

Protonation equilibria form between the acid and the amines according to a) and/or b). The position of the equilibria is temperature-dependent, and the equilibrium is shifted at higher temperatures toward the free oxonium ion and/or the amine salt having the lower enthalpy of protonation. Amines of the general formula (I) exhibit a particularly marked temperature dependence of the $pK_a$. The result of this is that, at relatively low temperatures as exist in the absorption step, the higher pH promotes efficient acid gas absorption, whereas, at relatively high temperatures as exist in the desorption step, the lower pH supports the release of the absorbed acid gases. It is expected that a high difference in the pH values of the absorbent between the absorption and desorption temperature will cause a lower regeneration energy.

By varying the molar ratio of b) to a) within the stated limits it is possible to adapt the $H_2S$ selectivity to the particular requirements. Despite reduced $H_2S$ selectivity, the regeneration energy is the same as or less than that of an $H_2S$-selective absorbent.

In general, the total concentration of a) and b) in the aqueous solution is 10% to 60% by weight, preferably 20% to 50% by weight, more preferably 30% to 50% by weight.

The molar ratio of b) to a) is in the range from 0.05 to 1.0, preferably 0.1 to 0.9, in particular 0.3 to 0.7.

The aqueous solution comprises acid in an amount, calculated as neutralization equivalent relative to the protonatable nitrogen atoms in a) and b), of 0.05 to 15.0%, preferably 1.0 to 9.0%, more preferably 2.5 to 6.5%.

A "neutralization equivalent" means the notional fraction of an acid molecule which is able, in the neutralization reaction in aqueous solution, to give up a proton. For example, one molecule of $H_2SO_4$ corresponds to two neutralization equivalents, one molecule of $H_3PO_4$ to three neutralization equivalents.

The term "protonatable nitrogen atoms" refers to the sum total of nitrogen atoms present in the amines as per a) and b) that can be protonated in aqueous solution. Generally speaking, these are nitrogen atoms of amino groups.

It has been found that the absorbent is subject to stability limits within the above-defined limits of the composition. Higher amounts of acid than specified or a greater molar ratio of b) to a) lead to a deterioration in stability and accelerated breakdown of the absorbent at elevated temperature.

The inventive absorbent comprises, as component a), at least one tertiary amine. A "tertiary amine" is understood to mean compounds having at least one tertiary amino group. The tertiary amine preferably comprises exclusively tertiary amino groups, meaning that it does not comprise any primary or secondary amino groups alongside at least one tertiary amino group. The tertiary amine is preferably a monoamine. The tertiary amine preferably does not have any acidic groups such as, in particular, phosphonic acid, sulfonic acid and/or carboxylic acid groups.

The suitable tertiary amines a) especially include:
1. Tertiary alkanolamines such as
bis(2-hydroxyethyl)methylamine (methyldiethanolamine, MDEA), tris(2-hydroxyethyl)amine (triethanolamine, TEA), tributanolamine, 2-diethylaminoethanol (diethylethanolamine, DEEA), 2-dimethylaminoethanol (dimethylethanolamine, DMEA), 3-dimethylamino-1-propanol (N,N-dimethylpropanolamine), 3-diethylamino-1-propanol, 2-diisopropylaminoethanol (DIEA), N,N-bis(2-hydroxypropyl)methylamine (methyldiisopropanolamine, MDIPA);
2. Tertiary amino ethers such as
3-methoxypropyldimethylamine;
3. Tertiary polyamines, for example bis-tertiary diamines such as
N,N,N',N'-tetramethylethylenediamine, N,N-diethyl-N',N'-dimethylethylenediamine, N,N,N',N'-tetramethylethylenediamine, N,N,N',N'-tetramethyl-1,3-propanediamine (TMPDA), N,N,N',N'-tetraethyl-1,3-propanediamine (TEPDA), N,N-dimethyl-N',N'-diethylethylenediamine (DMDEEDA), 1-dimethylamino-2-dimethylaminoethoxyethane (bis[2-(dimethylamino)ethyl] ether);
and mixtures thereof.

Tertiary alkanolamines, i.e. amines having at least one hydroxyalkyl group bonded to the nitrogen atom, are generally preferred. Particular preference is given to methyldiethanolamine (MDEA).

The absorbent of the invention comprises a sterically hindered secondary amine of the formula (I). In the formula (I), $R_1$, $R_2$ and $R_3$ are preferably methyl or ethyl; $R_4$, $R_5$ and $R_6$ are preferably methyl or hydrogen. Suitable sterically hindered secondary amines include secondary amino ether alkanols, such as the compounds disclosed in U.S. Pat. No. 4,471,128, for example. The secondary amino ether alkanols comprise, for example, 2-(2-tert-butylaminoethoxy)ethanol (TBAEE), 2-(2-tert-butylamino)propoxyethanol, tert-amylaminoethoxyethanol, (1-methyl-1-ethylpropylamino)ethoxyethanol, 2-2-(2-isopropylamino)propoxyethanol, and mixtures thereof. Preference is given to 2-(2-tert-butylaminoethoxy)ethanol (TBAEE).

Amines of the formula (I) comprise those which are referred to in the prior art as highly sterically hindered amines and have a steric parameter (Taft constant) $E_S$ of more than 1.75.

The inventive absorbent comprises at least one acid. The acid is suitably selected from protic acids (Brønsted acids), preferably having a $pK_a$ of less than 6, especially less than 5. In the case of acids having more than one dissociation stage and accordingly more than one $pK_a$, this requirement is met where one of the $pK_a$ values is within the range specified.

The acid is selected from organic and inorganic acids. Suitable organic acids comprise, for example, phosphonic acids, sulfonic acids, carboxylic acids and amino acids. In particular embodiments, the acid is a polybasic acid.

Suitable acids are, for example, mineral acids such as hydrochloric acid, sulfuric acid, amidosulfuric acid, phosphoric acid, partial esters of phosphoric acid, for example mono- and dialkyl phosphates and mono- and diaryl phosphates such as tridecyl phosphate, dibutyl phosphate, diphenyl phosphate and bis(2-ethylhexyl) phosphate; boric acid;

carboxylic acids, for example saturated aliphatic monocarboxylic acids such as formic acid, acetic acid, propionic acid, butyric acid, isobutyric acid, valeric acid, isovaleric acid, pivalic acid, caproic acid, n-heptanoic acid, caprylic acid, 2-ethyihexanoic acid, pelargonic acid, caproic acid, neodecanoic acid, undecanoic acid, lauric acid, tridecanoic acid, myristic acid, pentadecanoic acid, palmitic acid, margaric acid, stearic acid, isostearic acid, arachic acid, behenic acid; saturated aliphatic polycarboxylic acids such as oxalic acid, malonic acid, succinic acid, glutaric acid, adipic acid, pimelic acid, suberic acid, azelaic acid, sebacic acid, dodecanedioic acid; cycloaliphatic mono- and polycarboxylic acids such as cyclohexanecarboxylic acid, hexahydrophthalic acid, tetrahydrophthalic acid, resin acids, naphthenic acids; aliphatic hydroxycarboxylic acids such as glycolic acid, lactic acid, mandelic acid, hydroxybutyric acid, tartaric acid, malic acid, citric acid; halogenated aliphatic carboxylic acids such as trichloroacetic acid or 2-chloropropionic acid; aromatic mono- and polycarboxylic acids such as benzoic acid, salicylic acid, gallic acid, the positionally isomeric toluic acids, methoxybenzoic acids, chlorobenzoic acids, nitrobenzolc acids, phthalic acid, terephthalic acid, isophthalic acid; technical carboxylic acid mixtures, for example Versatic acids;

sulfonic acids such as methylsulfonic acid, butylsulfonic acid, 3-hydroxypropylsulfonic acid, sulfoacetic acid, benzenesulfonic acid, p-toluenesulfonic acid, p-xylenesulfonic acid, 4-dodecylbenzenesulfonic acid, 1-naphthalenesulfonic acid, dinonylnaphthalenesulfonic acid and dinonylnaphthalenedisulfonic acid, trifluoromethyl- or nonafluoro-n-butylsulfonic acid, camphorsulfonic acid, 2-(4-(2-hydroxyethyl)-1-piperazinyl)ethanesulfonic acid (HEPES);

organic phosphonic acids, for example phosphonic acids of the formula II

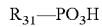

$R_{31}$—$PO_3H$ (VIII)

in which $R_{31}$ is $C_{1-18}$-alkyl optionally substituted by up to four substituents independently selected from carboxyl, carboxamido, hydroxyl and amino.

These include alkylphosphonic acids such as methylphosphonic acid, propylphosphonic acid, 2-methylpropylphosphonic acid, t-butylphosphonic acid, n-butylphosphonic acid, 2,3-dimethylbutylphosphonic acid, octylphosphonic acid; hydroxyalkylphosphonic acids such as hydroxymethylphosphonic acid, 1-hydroxyethylphosphonic acid, 2-hydroxyethylphosphonic acid; arylphosphonic acids such as phenylphosphonic acid, tolylphosphonic acid, xylylphosphonic acid, aminoalkylphosphonic acids such as aminomethylphosphonic acid, 1-aminoethylphosphonic acid, 1-dimethylaminoethylphosphonic acid, 2-aminoethylphosphonic acid, 2-(N-methylamino)ethylphosphonic acid, 3-aminopropylphosphonic acid, 2-aminopropylphosphonic acid, 1-aminopropylphosphonic acid, 1-aminopropyl-2-chloropropylphosphonic acid, 2-aminobutylphosphonic acid, 3-aminobutylphosphonic acid, 1-aminobutylphosphonic acid, 4-aminobutylphosphonic acid, 2-aminopentylphosphonic acid, 5-aminopentylphosphonic acid, 2-aminohexylphosphonic acid, 5-aminohexylphosphonic acid, 2-aminooctylphosphonic acid, 1-aminooctylphosphonic acid, 1-aminobutylphosphonic acid; amidoalkylphosphonic acids such as 3-hydroxymethylamino-3-oxopropylphosphonic acid; and phosphonocarboxylic acids such as 2-hydroxyphosphonoacetic acid and 2-phosphonobutane-1,2,4-tricarboxylic acid;

phosphonic acids of the formula III

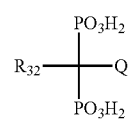

(III)

in which $R_{32}$ is H or $C_{1-6}$-alkyl, Q is H, OH or $NY_2$ and Y is H or $CH_2PO_3H_2$, such as 1-hydroxyethane-1,1-diphosphonic acid;

phosphonic acids of the formula IV

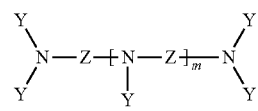

(IV)

in which Z is $C_{2-6}$-alkylene, cycloalkanedlyl, phenylene, or $C_{2-6}$-alkylene interrupted by cycloalkanedlyl or phenylene, Y is $CH_2PO_3H_2$ and m is 0 to 4, such as ethylenediaminetetra(methylenephosphonic acid), diethylenetriaminepenta(methylenephosphonic acid) and bis(hexamethylene)triaminepenta(methylenephosphonic acid);

phosphonic acids of the formula V

$R_{33}$—$NY_2$ (V)

in which $R_{33}$ is $C_{1-6}$-alkyl, $C_{2-6}$-hydroxyalkyl or Y, and Y is $CH_2PO_3H_2$, such as nitrilotris(methylenephosphonic acid) and 2-hydroxyethyliminobis(methylenephosphonic acid);

tertiary aminocarboxylic acids, i.e. aminocarboxylic acids having tertiary amino groups, and N-sec-alkylaminocarboxylic acids and N-tert-alkylamino-carboxylic acids, i.e. amino acids having or amino groups and having at least one secondary or tertiary carbon atom immediately adjacent to the amino group, such as α-amino acids having tertiary amino groups or amino groups having at least one secondary or tertiary carbon atom immediately adjacent to the amino group, such as N,N-dimethyglycine (dimethylaminoacetic acid), N,N-diethylglycine, alanine (2-aminopropionic acid), N-methylalanine (2-(methylamino)propionic acid), N,N-dimethylalanine, N-ethylalanine, 2-methylalanine (2-aminoisobutyric acid), leucine (2-amino-4-methylpentan-1-oic acid), N-methylleucine, N,N-dimethylleucine, isoleucine (1-amino-2-methylpentanoic acid), N-methylisoleucine, N,N-dimethylisoleucine, valine (2-aminoisovaleric acid), α-methylvaline (2-amino-2-methylisovaleric acid), N-methylvaline (2-methylaminoisovaleric acid), N,N-dimethylvaline, proline (pyrrolidine-2-carboxylic acid), N-methylproline, N-methylserine, N,N-dimethylserine, 2-(methylamino) isobutyric acid, piperidine-2-carboxylic acid, N-methylpiperidine-2-carboxylic acid, β-aminocarboxylic acids having tertiary amino groups or amino groups having at least one secondary or tertiary carbon atom Immediately adjacent to the amino group, such as 3-dimethylaminopropionic acid, N-methyliminodipropionic acid, N-methylpiperidine-3-carboxylic acid, γ-amino acids having tertiary amino groups or amino groups having at least one secondary or tertiary carbon atom immediately adjacent to the amino group, such as 4-dimethylaminobutyric acid,
or aminocarboxylic acids having tertiary amino groups or amino groups having at least one secondary or tertiary carbon atom immediately adjacent to the amino group, such as N-methylpiperidine-4-carboxylic acid.

Among the inorganic acids, preference is given to phosphoric acid and sulfuric acid.

Among the carboxylic acids, preference is given to formic acid, acetic acid, benzoic acid, succinic acid and adipic acid.

Among the sulfonic acids, preference is given to methanesulfonic acid, p-toluenesulfonic acid and 2-(4-(2-hydroxyethyl)-1-piperazinyl)ethanesulfonic acid (HEPES).

Among the phosphonic acids, preference is given to 2-hydroxyphosphonoacetic acid, 2-phosphonobutane-1,2,4-tricarboxylic acid, 1-hydroxyethane-1,1-diphosphonic acid, ethylenediaminetetra(methylenephosphonic acid), diethylenetriaminepenta(methylenephosphonic acid), bis(hexamethylene)triaminepenta(methylenephosphonic acid) (HDTMP) and nitrilotris(methylenephosphonic acid), among which 1-hydroxyethane-1,1-diphosphonic acid is particularly preferred.

Among the aminocarboxylic acids having tertiary amino groups or amino groups having at least one secondary or tertiary carbon atom immediately adjacent to the amino group, preference is given to N,N-dimethylglycine and N-methylalanine.

More preferably, the acid is an inorganic acid.

The absorbent may also comprise additives such as corrosion inhibitors, enzymes, etc. In general, the amount of such additives is in the range from about 0.01% to 3% by weight of the absorbent.

Preferably, the absorbent does not comprise any sterically unhindered primary or secondary amine. Compounds of this kind act as strong promoters of $CO_2$ absorption.

As a result of their presence, the $H_2S$ selectivity of the absorbent can be lost.

A sterically unhindered primary or secondary amine is understood to mean compounds having primary or secondary amino groups to which only hydrogen atoms or primary carbon atoms are bonded.

The invention also relates to a process for the removal of acidic gases from a fluid stream, in which the fluid stream is contacted with the absorbent defined above.

In general, the laden absorbent is regenerated by
a) heating,
b) decompression,
c) stripping with an inert fluid
or a combination of two or all of these measures.

The process according to the invention is suitable for treatment of all kinds of fluids. Fluids are firstly gases such as natural gas, synthesis gas, coke oven gas, cracking gas, coal gasification gas, cycle gas, landfill gases and combustion gases, and secondly fluids that are essentially immiscible with the absorbent, such as LPG (liquefied petroleum gas) or NGL (natural gas liquids). The process according to the invention is particularly suitable for treatment of hydrocarbonaceous fluid streams. The hydrocarbons present are, for example, aliphatic hydrocarbons such as $C_{1-4}$ hydrocarbons such as methane, unsaturated hydrocarbons such as ethylene or propylene, or aromatic hydrocarbons such as benzene, toluene or xylene.

The absorbent or process according to the invention is suitable for removal of $CO_2$ and $H_2S$. As well as carbon dioxide and hydrogen sulfide, it is possible for other acidic gases to be present in the fluid stream, such as COS and mercaptans. In addition, it is also possible to remove $SO_3$, $SO_2$, $CS_2$ and HCN.

The process according to the invention is suitable for selective removal of hydrogen sulfide over $CO_2$. In the present context, "selectivity for hydrogen sulfide" is understood to mean the value of the following quotient:

$$\frac{\frac{y(H_2S)_{feed} - y(H_2S)_{treat}}{y(H_2S)_{feed}}}{\frac{y(CO_2)_{feed} - y(CO_2))_{treat}}{y(CO_2))_{feed}}}$$

in which $y(H_2S)_{feed}$ is the molar proportion (mol/mol) of $H_2S$ in the starting fluid, $y(H_2S)_{treat}$ is the molar proportion in the treated fluid, $y(CO_2)_{feed}$ is the molar proportion of $CO_2$ in the starting fluid and $y(CO_2)_{treat}$ is the molar proportion of $CO_2$ in the treated fluid.

In preferred embodiments, the fluid stream is a fluid stream comprising hydrocarbons, especially a natural gas stream. More preferably, the fluid stream comprises more than 1.0% by volume of hydrocarbons, even more preferably more than 5.0% by volume of hydrocarbons, most preferably more than 15% by volume of hydrocarbons.

The partial hydrogen sulfide pressure in the fluid stream is typically at least 2.5 mbar. In preferred embodiments, a partial hydrogen sulfide pressure of at least 0.1 bar, especially at least 1 bar, and a partial carbon dioxide pressure of at least 0.2 bar, especially at least 1 bar, is present in the fluid stream. More preferably, a partial hydrogen sulfide pressure of at least 0.1 bar and a partial carbon dioxide pressure of at least 1 bar is present in the fluid stream. Most preferably, a partial hydrogen sulfide pressure of at least 0.5 bar and a partial carbon dioxide pressure of at least 1 bar is present in the fluid stream. The partial pressures stated are based on the fluid stream on first contact with the absorbent in the absorption step.

In preferred embodiments, a total pressure of at least 3.0 bar, more preferably at least 5.0 bar, even more preferably at least 20 bar, is present in the fluid stream. In preferred embodiments, a total pressure of at most 180 bar is present in the fluid stream. The total pressure is based on the fluid stream on first contact with the absorbent in the absorption step.

In the process according to the invention, the fluid stream is contacted with the absorbent in an absorption step in an absorber, as a result of which carbon dioxide and hydrogen sulfide are at least partly scrubbed out. This gives a $CO_2$- and $H_2S$-depleted fluid stream and a $CO_2$- and $H_2S$-laden absorbent.

The absorber used is a scrubbing apparatus used in customary gas scrubbing processes. Suitable scrubbing apparatuses are, for example, random packings, columns having structured packings and having trays, membrane contactors, radial flow scrubbers, jet scrubbers, Venturi scrubbers and rotary spray scrubbers, preferably columns having structured packing, having random packings and having trays, more preferably columns having trays and having random packings. The fluid stream is preferably treated with the absorbent in a column in countercurrent. The fluid is generally fed into the lower region and the absorbent into the upper region of the column. Installed in tray columns are sieve trays, bubble-cap trays or valve trays, over which the liquid flows. Columns having random packings can be filled with different shaped bodies. Heat and mass transfer are improved by the increase in the surface area caused by the shaped bodies, which are usually about 25 to 80 mm in size. Known examples are the Raschig ring (a hollow cylinder), Pall ring, Hiflow ring, Intalox saddle and the like. The random packings can be introduced into the column in an ordered manner, or else randomly (as a bed). Possible materials include glass, ceramic, metal and plastics. Structured packings are a further development of ordered random packings. They have a regular structure. As a result, it is possible in the case of structured packings to reduce pressure drops in the gas flow. There are various designs of structured packings, for example woven packings or sheet metal packings. Materials used may be metal, plastic, glass and ceramic.

The temperature of the absorption medium in the absorption step is generally about 30 to 100° C., and when a column is used is, for example, 30 to 70° C. at the top of the column and 50 to 100° C. at the bottom of the column.

The process according to the invention may comprise one or more, especially two, successive absorption steps. The absorption can be conducted in a plurality of successive component steps, in which case the crude gas comprising the acidic gas constituents is contacted with a substream of the absorbent in each of the component steps. The absorbent with which the crude gas is contacted may already be partly laden with acidic gases, meaning that it may, for example, be an absorbent which has been recycled from a downstream absorption step into the first absorption step, or be partly regenerated absorbent. With regard to the performance of the two-stage absorption, reference is made to publications EP 0 159 495, EP 0 190 434, EP 0 359 991 and WO 00100271.

The process according to the invention may comprise one or more, especially two, successive absorption steps. The absorption can be conducted in a plurality of successive component steps, in which case the crude gas comprising the acidic gas constituents is contacted with a substream of the absorbent in each of the component steps. The absorbent with which the crude gas is contacted may already be partly laden with acidic gases, meaning that it may, for example, be an absorbent which has been recycled from a downstream absorption step into the first absorption step, or be partly regenerated absorbent. With regard to the performance of the two-stage absorption, reference is made to publications EP 0 159 495, EP 0 190 434, EP 0 359 991 and WO 00100271.

The process preferably comprises a regeneration step in which the $CO_2$- and $H_2S$-laden absorbent is regenerated. In the regeneration step, $CO_2$ and $H_2S$ and optionally further acidic gas constituents are released from the $CO_2$- and $H_2S$-laden absorbent to obtain a regenerated absorbent. Preferably, the regenerated absorbent is subsequently recycled into the absorption step. In general, the regeneration step comprises at least one of the measures of heating, decompressing and stripping with an inert fluid.

The regeneration step preferably comprises heating of the absorbent laden with the acidic gas constituents, for example by means of a boiler, natural circulation evaporator, forced circulation evaporator or forced circulation flash evaporator. The absorbed acid gases are stripped out by means of the steam obtained by heating the solution. Rather than steam, it is also possible to use an inert fluid such as nitrogen. The absolute pressure in the desorber is normally 0.1 to 3.5 bar, preferably 1.0 to 2.5 bar. The temperature is normally 50° C. to 170° C., preferably 80° C. to 130° C., the temperature of course being dependent on the pressure.

The regeneration step may alternatively or additionally comprise a decompression. This includes at least one decompression of the laden absorbent from a high pressure as exists in the conduction of the absorption step to a lower pressure. The decompression can be accomplished, for example, by means of a throttle valve and/or a decompression turbine. Regeneration with a decompression stage is described, for example, in publications U.S. Pat. Nos. 4,537, 753 and 4,553,984.

The acidic gas constituents can be released in the regeneration step, for example, in a decompression column, for example a flash vessel installed vertically or horizontally, or a countercurrent column with internals.

The regeneration column may likewise be a column having random packings, having structured packings or having trays. The regeneration column, at the bottom, has a heater, for example a forced circulation evaporator with circulation pump. At the top, the regeneration column has an outlet for the acid gases released. Entrained absorption medium vapors are condensed in a condenser and recirculated to the column.

It is possible to connect a plurality of decompression columns in series, in which regeneration is effected at different pressures. For example, regeneration can be effected in a preliminary decompression column at a high pressure typically about 1.5 bar above the partial pressure of the acidic gas constituents in the absorption step, and in a main decompression column at a low pressure, for example 1 to 2 bar absolute. Regeneration with two or more decompression stages is described in publications U.S. Pat. Nos. 4,537,753, 4,553,984, EP 0 159 495, EP 0 202 600, EP 0 190 434 and EP 0 121 109.

Because of the optimal matching of the content of the amine components and of the acid, the inventive absorbent has a high loading capacity with acidic gases, which can also be desorbed again easily. In this way, it is possible to significantly reduce energy consumption and solvent circulation in the process according to the invention.

For a minimum energy requirement in the regeneration of the absorbent, it is advantageous when there is a maximum difference between the pH at the temperature of the absorption and the pH at the temperature of the desorption, since this facilitates the separation of the acid gases from the absorbent.

The invention is illustrated in detail by the appended drawing and the example which follows.

FIG. 1 is a schematic diagram of a plant suitable for performing the process according to the invention.

According to FIG. 1, via the inlet Z, a suitably pretreated gas comprising hydrogen sulfide and carbon dioxide is contacted in countercurrent, in an absorber A1, with regenerated absorbent which is fed in via the absorbent line 1.01. The absorbent removes hydrogen sulfide and carbon dioxide from the gas by absorption; this affords a hydrogen sulfide- and carbon dioxide-depleted clean gas via the offgas line 1.02.

Via the absorbent line 1.03, the heat exchanger 1.04 in which the $CO_2$- and $H_2S$-laden absorbent is heated up with the heat from the regenerated absorbent conducted through the absorbent line 1.05, and the absorbent line 1.06, the $CO_2$- and $H_2S$-laden absorbent is fed to the desorption column D and regenerated.

Between the absorber A1 and heat exchanger 1.04, a flash vessel may be provided (not shown in FIG. 1), in which the $CO_2$- and $H_2S$-laden absorbent is decompressed to, for example, 3 to 15 bar.

From the lower part of the desorption column D, the absorbent is conducted into the boiler 1.07, where it is heated. The mainly water-containing vapor is recycled into the desorption column D, while the regenerated absorbent is fed back to the absorber A1 via the absorbent line 1.05, the heat exchanger 1.04 in which the regenerated absorbent heats up the $CO_2$- and $H_2S$-laden absorbent and at the same time cools down itself, the absorbent line 1.08, the cooler 1.09 and the absorbent line 1.01. Instead of the boiler shown, it is also possible to use other heat exchanger types to generate the stripping vapor, such as a natural circulation evaporator, forced circulation evaporator or forced circulation flash evaporator. In the case of these evaporator types, a mixed-phase stream of regenerated absorbent and stripping vapor is returned to the bottom of the desorption column, where the phase separation between the vapor and the absorbent takes place. The regenerated absorbent to the heat exchanger 1.04 is either drawn off from the circulation stream from the bottom of the desorption column to the evaporator or conducted via a separate line directly from the bottom of the desorption column to the heat exchanger 1.04.

The $CO_2$- and $H_2S$-containing gas released in the desorption column D leaves the desorption column D via the offgas line 1.10. It is conducted into a condenser with integrated phase separation 1.11, where it is separated from entrained absorbent vapor. In this and all the other plants suitable for performance of the process according to the invention, condenser and phase separation may also be present separately from one another. Subsequently, a liquid consisting mainly of water is conducted through the absorbent line 1.12 into the upper region of the desorption column D, and a $CO_2$- and $H_2S$-containing gas is discharged via the gas line 1.13.

EXAMPLES

In the examples, the following abbreviations are used:
MDEA: methyldiethanolamine
TBAEE: 2-(2-tert-butylaminoethoxy)ethanol Example 1

The temperature dependence of the pH of aqueous amine solutions or partly neutralized amine solutions was determined in the temperature range from 20° C. to 120° C. A pressure apparatus was used, in which the pH can be measured up to 120° C.

The table which follows reports the pH (50° C.), the pH (120° C.) and the difference pH(50° C.)-pH(120° C.).

It is clear that there is a greater difference between the pH values at 50° C. and 120° C. in the inventive examples. Since the absorption is effected in the region of 50° C. and desorption or regeneration in the region of 120° C., the greater pH differential is a pointer to an energetically improved regeneration.

Example 2

In a pilot plant, the $CO_2$ absorption and the heating energy introduced in the course of regeneration for a defined $H_2S$ concentration of the cleaned gas were examined for aqueous absorbents.

The pilot plant corresponded to FIG. 1. In the absorber, a structured packing was used. The pressure was 60 bar. The packing height in the absorber was 3.2 m with a column diameter of 0.0531 m. In the desorber, a structured packing was used. The pressure was 1.8 bar. The packing height in the desorber was 6.0 m with a diameter of 0.085 m.

A gas mixture of 93% by volume of $N_2$, 5% by volume of $CO_2$ and 2% by volume of $H_2S$ was conducted into the absorber at a mass flow rate of 47 kg/h and a temperature of 40° C. In the absorber, the absorbent circulation rate was 60 kg/h. The temperature of the absorbent was 50° C. The regeneration energy was adjusted such that an $H_2S$ concentration of 5 ppm was attained in the cleaned gas.

The following table shows the results of these experiments:

| Ex. | Aqueous composition | y($CO_2$) at absorber outlet [% by vol.] | Relative regeneration energy** [%] |
|---|---|---|---|
| 2-1* | 40% MDEA | 1.87 | 100.0 |
| 2-2* | 40% MDEA + 0.5% $H_3PO_4$ | 1.89 | 73.3 |
| 2-3* | 30% MDEA + 15% TBAEE | 0.91 | 91.6 |
| 2-4 | 30% MDEA + 15% TBAEE + 0.8% $H_3PO_4$ | 0.99 | 57.8 |
| 2-5* | 30% MDEA + 15% TBAEE + 1.6% $H_3PO_4$ | 1.15 | 56.9 |
| 2-6 | 30% MDEA + 15% TBAEE + 0.6% $H_2SO_4$ | 1.54 | 65.1 |
| 2-7 | 30% MDEA + 15% TBAEE + 0.8% $H_2SO_4$ | 1.47 | 64.8 |
| 2-8 | 30% MDEA + 15% TBAEE + 1.2% $H_2SO_4$ | 1.50 | 64.1 |
| 2-9 | 30% MDEA + 15% TBAEE + 1.6% $H_2SO_4$ | 1.55 | 62.2 |

*comparative example
**with regard to example 2-1*

| Ex. | Composition | b/a** | DN*** [%] | pH (50° C.) | pH (120° C.) | pH (50° C.) − pH (120° C.) |
|---|---|---|---|---|---|---|
| 1-1* | 40% MDEA | — | — | 11.01 | 9.58 | 1.43 |
| 1-2* | 40% MDEA + 0.5% $H_3PO_4$ | — | 5.02 | 9.76 | 8.29 | 1.47 |
| 1-3 | 40% MDEA + 6.2% TBAEE + 0.118% $H_2SO_4$ | 0.11 | 0.64 | 10.87 | 9.2 | 1.67 |
| 1-4 | 40% MDEA + 6.2% TBAEE + 1.89% $H_2SO_4$ | 0.11 | 10.30 | 9.45 | 7.9 | 1.55 |
| 1-5 | 30% MDEA + 15% TBAEE + 0.3% $H_2SO_4$ | 0.37 | 1.77 | 10.57 | 8.83 | 1.74 |
| 1-6 | 30% MDEA + 15% TBAEE + 0.6% $H_2SO_4$ | 0.37 | 3.55 | 10.21 | 8.4 | 1.81 |
| 1-7 | 30% MDEA + 15% TBAEE + 0.8% $H_2SO_4$ | 0.37 | 4.73 | 9.89 | 8.16 | 1.73 |
| 1-8 | 30% MDEA + 15% TBAEE + 1.2% $H_2SO_4$ | 0.37 | 7.10 | 9.79 | 8.13 | 1.66 |
| 1-9 | 30% MDEA + 15% TBAEE + 1.6% $H_2SO_4$ | 0.37 | 9.46 | 9.77 | 7.9 | 1.87 |
| 1-10 | 30% MDEA + 15% TBAEE + 0.3% $H_3PO_4$ | 0.37 | 2.66 | 10.56 | 8.81 | 1.75 |
| 1-11 | 30% MDEA + 15% TBAEE + 0.8% $H_3PO_4$ | 0.37 | 7.10 | 10.21 | 8.49 | 1.72 |
| 1-12 | 30% MDEA + 15% TBAEE + 1.6% $H_3PO_4$ | 0.37 | 14.21 | 9.82 | 8.06 | 1.76 |

*comparative example
**molar ratio of b/a
***degree of neutralization (based on TBAEE + MDEA)

In a comparison of comparative example 2-2* with examples 2-4 to 2-9, it is clear that the additional use of TBAEE brings about an increased $CO_2$ absorption (lower $CO_2$ concentration $y(CO_2)$ at the absorber outlet) for the same $H_2S$ absorption. At the same time, the heating energy introduced in the regeneration remains approximately the same or falls. The comparison of comparative example 2-3* with examples 2-6 to 2-9 shows that the addition of acid significantly lowers the heating energy introduced in the course of the regeneration. Since the $H_2S$ concentration in the purified gas was always 5 ppm, the examples show how varying the compositions within the limits according to the invention permits the setting of a defined $H_2S$ selectivity.

Example 3

The stability of various aqueous absorbents was investigated.

Aqueous solutions having an MDEA and TBAEE content in accordance with the table below, and a loading in each case of 20 m³(STP)/t(absorbent) $CO_2$ and $H_2S$ were held in a closed vessel at a temperature of 160° C. for 125 hours. Subsequently the amount of undecomposed MDEA was determined, and the fraction of decomposed MDEA was calculated.

The results are listed in the table below.

| Ex. | MDEA [% by wt.] | TBAEE [% by wt.] | Acid | DN** [%] | Decomposed MDEA [%] |
|---|---|---|---|---|---|
| 3-1* | 35.7 | 12.1 | 3.7% by wt. $H_2SO_4$ | 20.1 | 20 |
| 3-2 | 35.7 | 12.1 | 2.0% by wt. $H_2SO_4$ | 10.9 | 19 |
| 3-3 | 35.7 | 12.1 | 1.0% by wt. $H_2SO_4$ | 5.4 | 14 |
| 3-4 | 35.7 | 12.1 | 0.5% by wt. $H_2SO_4$ | 2.7 | 8 |
| 3-5* | 35.7 | 12.1 | — | — | 2.5 |

*comparative example
**degree of neutralization (based on TBAEE + MDEA).

It is evident that the presence of acid accelerates the decomposition of MDEA The degree of decomposition is dependent on the amount of acid, which is why a relatively small amount of acid as in the compositions according to the invention is advantageous.

The invention claimed is:

1. A process for removing an acidic gas from a fluid stream, said process comprising:
   contacting the fluid stream which is selected from gases and which has a total pressure of at least 3.0 bar, with an absorbent, comprising an aqueous solution comprising:
   a) a tertiary amine;
   b) a sterically hindered secondary amine of the general formula (I)

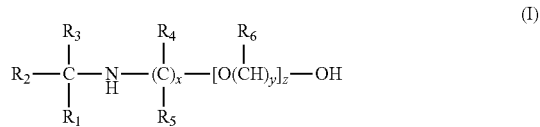

in which $R_1$ and $R_2$ are each independently selected from $C_{1-4}$-alkyl and $C_{1-4}$-hydroxyalkyl; $R_3$, $R_4$, $R_5$ and $R_6$ are each independently selected from hydrogen, $C_{1-4}$-alkyl and $C_{1-4}$-hydroxyalkyl, with the proviso that at least one $R_4$ and/or $R_5$ radical on the carbon atom bonded directly to the nitrogen atom is $C_{1-4}$-alkyl or $C_{1-4}$-hydroxyalkyl when $R_3$ is hydrogen; x and y are integers from 2 to 4 and z is an integer from 1 to 4; where the molar ratio of b) to a) is in the range from 0.3 to 0.7, and
   c) an acid in an amount, calculated as neutralization equivalent relative to the protonatable nitrogen atoms in a) and h), of 1.0 to 9.0%;
   wherein
   the acid is selected from the group consisting of a mineral acid (excluding phosphoric acid and partial esters thereof), a carboxylic acid, a sulfonic acid, a tertiary aminocarboxylic acid, an N-sec-alkylaminocarboxylic acid and an N-tert-alkylamino-carboxylic acid, with the proviso that the acid does not comprise a phosphonic acid, and there is
   a partial hydrogen sulfide pressure of at least 0.1 bar and/or a partial carbon dioxide pressure of at least 0.2 bar in the fluid stream.

2. The process according to claim 1, wherein the fluid stream comprises a hydrocarbon.

3. The process according to claim 1, wherein there is a partial hydrogen sulfide pressure of at least 0.1 bar and a partial carbon dioxide pressure of at least 1.0 bar in the fluid stream.

4. The process according to claim 1, wherein the laden absorbent is regenerated by
   a) heating,
   b) decompression,
   c) stripping with an inert fluid
   or a combination of two or all of these measures.

* * * * *

UNITED STATES PATENT AND TRADEMARK OFFICE
CERTIFICATE OF CORRECTION

PATENT NO. : 10,464,013 B2
APPLICATION NO. : 15/506451
DATED : November 5, 2019
INVENTOR(S) : Gerald Vorberg et al.

It is certified that error appears in the above-identified patent and that said Letters Patent is hereby corrected as shown below:

In the Specification

In Column 1, Line 60, delete "reads" and insert -- reacts --, therefor.

In Column 5, Line 14, delete "2-ethyihexanoic" and insert -- 2-ethylhexanoic --, therefor.

In Column 5, Line 31, delete "nitrobenzolc" and insert -- nitrobenzoic --, therefor.

In Column 5, Line 17, delete "arachic" and insert -- arachidic --, therefor.

In Column 6, Line 28, delete "cycloalkanedlyl," and insert -- cycloalkanediyl, --, therefor.

In Column 6, Line 29, delete "cycloalkanedlyl" and insert -- cycloalkanediyl --, therefor.

In Column 6, Lines 48-49, delete "N,N-dimethyglycine" and insert -- N,N-dimethylglycine --, therefor.

In Column 6, Line 65, delete "Immediately" and insert -- immediately --, therefor.

In Column 9, Lines 32-44, below "and WO 00100271." delete "The process according.........EP 0 359 991 and WO 00100271.".

In Column 13, Line 39, delete "MDEA" and insert -- MDEA. --, therefor.

In the Claims

In Column 14, Line 25, Claim 1, delete "h)," and insert -- b), --, therefor.

Signed and Sealed this
Nineteenth Day of May, 2020

Andrei Iancu
*Director of the United States Patent and Trademark Office*